(12) United States Patent
Heninwolf

(10) Patent No.: US 8,471,415 B1
(45) Date of Patent: Jun. 25, 2013

(54) IDENTIFYING A DEVICE WITH A UNIVERSAL POWER SUPPLY BY READING A COMMUNICATION TAG

(75) Inventor: Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/608,015

(22) Filed: Sep. 10, 2012

(51) Int. Cl.
*H01H 9/16* (2006.01)

(52) U.S. Cl.
USPC .......................................... 307/140; 307/125

(58) Field of Classification Search
USPC .................................. 307/125, 140
See application file for complete search history.

(56) References Cited

U.S. PATENT DOCUMENTS

| | | | | |
|---|---|---|---|---|
| 4,915,639 A * | 4/1990 | Cohn et al. | | 439/188 |
| 5,570,002 A * | 10/1996 | Castleman | | 323/283 |
| 5,910,776 A * | 6/1999 | Black | | 340/10.1 |
| 6,049,143 A | 4/2000 | Simpson et al. | | |
| 6,054,846 A * | 4/2000 | Castleman | | 323/283 |
| 6,362,610 B1 * | 3/2002 | Yang | | 323/281 |
| 6,459,175 B1 * | 10/2002 | Potega | | 307/149 |
| 6,993,417 B2 * | 1/2006 | Osann, Jr. | | 700/291 |
| 7,127,623 B2 * | 10/2006 | Potega | | 713/300 |
| 7,167,078 B2 | 1/2007 | Pourchot | | |
| 7,212,420 B2 * | 5/2007 | Liao | | 363/146 |
| 7,392,410 B2 * | 6/2008 | Allen et al. | | 713/310 |
| 7,646,107 B2 * | 1/2010 | Smith | | 307/11 |
| 7,657,763 B2 | 2/2010 | Nelson et al. | | |
| 7,930,043 B2 * | 4/2011 | Bhogal et al. | | 700/22 |
| 8,000,074 B2 * | 8/2011 | Jones et al. | | 361/93.1 |
| 8,004,112 B2 * | 8/2011 | Koga et al. | | 307/36 |
| 8,149,570 B2 * | 4/2012 | Keebler et al. | | 361/622 |
| 8,225,111 B2 * | 7/2012 | Bailey et al. | | 713/300 |
| 2002/0166890 A1 * | 11/2002 | Hsuan et al. | | 235/375 |
| 2003/0043028 A1 * | 3/2003 | Torikai et al. | | 340/310.01 |
| 2005/0083615 A1 * | 4/2005 | Rose | | 361/18 |
| 2007/0149013 A1 * | 6/2007 | Eastham et al. | | 439/140 |
| 2008/0126292 A1 * | 5/2008 | Bhogal et al. | | 707/1 |
| 2009/0192927 A1 * | 7/2009 | Berg et al. | | 705/34 |
| 2010/0145536 A1 * | 6/2010 | Masters et al. | | 700/292 |
| 2011/0121656 A1 * | 5/2011 | Hicks et al. | | 307/80 |
| 2012/0049639 A1 * | 3/2012 | Besore et al. | | 307/97 |
| 2012/0119577 A1 * | 5/2012 | Clarke | | 307/40 |

FOREIGN PATENT DOCUMENTS

WO 2011064535 A3 6/2011

\* cited by examiner

*Primary Examiner* — Adi Amrany
(74) *Attorney, Agent, or Firm* — Morris & Kamlay LLP

(57) ABSTRACT

Disclosed is a system and method for supplying power to devices from a receptacle with a universal pin configuration. In an example configuration, a plug reader and a controller are provided. The plug reader reads a communication tag of an electrical device plug, and receives data read from the plug reader from which it can identify an electrical capability of the electrical device, such voltage and/or frequency compatibility of the device. Based on the compatibility data, the controller determines whether a universal power supply is included in the device and causes power to be provided to the device.

16 Claims, 3 Drawing Sheets

200

210 — reading a device plug identification tag that is inserted in a universal plug outlet 220 — obtaining the electrical capability data of a device from the read device plug identification tag 230 — comparing the obtained data with a list of devices having universal power supplies that are compatible with electric power supplied by the universal plug outlet 240 — providing electrical power to the device based on the results of the comparison

FIG. 2

IDENTIFYING A DEVICE WITH A UNIVERSAL POWER SUPPLY BY READING A COMMUNICATION TAG

BACKGROUND

Alternating current (AC) outlets in different regions of the world supply different AC voltages and frequencies. Historically, different pin configurations on the outlet and plug are used to prevent insertion of a plug into an outlet carrying an AC supply that a device cannot support. Recently, some devices are able to use a variety of voltages and/or frequencies because the device includes a "universal" power supply that conditions the supplied electrical power to form suitable for operation of the device. Popularity of these universal devices has also popularized the use of universal pin configurations, allowing the insertion of a variety of plug types into a single outlet. This allows a device with a universal power supply to be easily used in a region with, typically, a different pin configuration.

However, a potential hazardous situation exists because not all devices include a "universal" power supply to condition the supplied power. For example, a user may plug an 110V-only appliance into a 240V outlet. As a result, the appliance may be destroyed and possibly cause a fire.

BRIEF SUMMARY

According to an embodiment of the disclosed subject matter, a method is provided for supplying power to a device able to safely support the form of power available, and preventing the supply of power to devices unable to safely handle the available power. The method may include reading a device plug identification tag that may be inserted in an outlet. The outlet may be capable of delivering high residential or commercial voltages. Electrical capability data of a device may be obtained from the read device plug identification tag. The electrical capability data may indicate that the device contains a universal power supply. A controller may compare the obtained data with a list of devices that are compatible with supplied electric power. The supply of electrical power to the device may be enabled or disabled based on the results of the comparison.

Another embodiment of the presently disclosed subject matter provides a method for enabling power to be supplied through a receptacle device having a universal pin configuration. The method may include reading by the receptacle device with the universal pin configuration a device plug identification tag inserted into an electrical device. An electrical capability of the electrical device may be identified. The electrical capability of the electrical device may be at least one of a voltage and frequency compatibility of the device. Based on the read voltage and frequency, it may be determined whether a universal power supply is included in and compatible with the device. Based on the results of the determination, power may be supplied to the device.

Another embodiment of the presently disclosed subject matter provides a system for enabling power to be supplied to a receptacle device with a universal pin configuration. The system may include a plug reader, a controller, a power supply switch, a receptacle, and a transceiver. The plug reader may read a communication tag of an electrical device plug. The power supply switch may be responsive to control signals from the controller. The controller may be configured to receive data read from the plug reader. The controller, in response to receiving data read from the communication tag, may identify an electrical capability of the electrical device. The electrical capability of the electrical device may be at least one of a voltage and frequency compatibility of the device. Based on the at least one voltage and frequency compatibility data, the controller may be configured to determine whether the device includes a universal power supply. The controller, based on the results of the determination, may cause power to be provided to the device based on the results of the comparison. The transceiver may send and receive signals under control of the controller.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 2 shows a process flowchart according to an embodiment of the disclosed subject matter.

DETAILED DESCRIPTION

Figure 1:
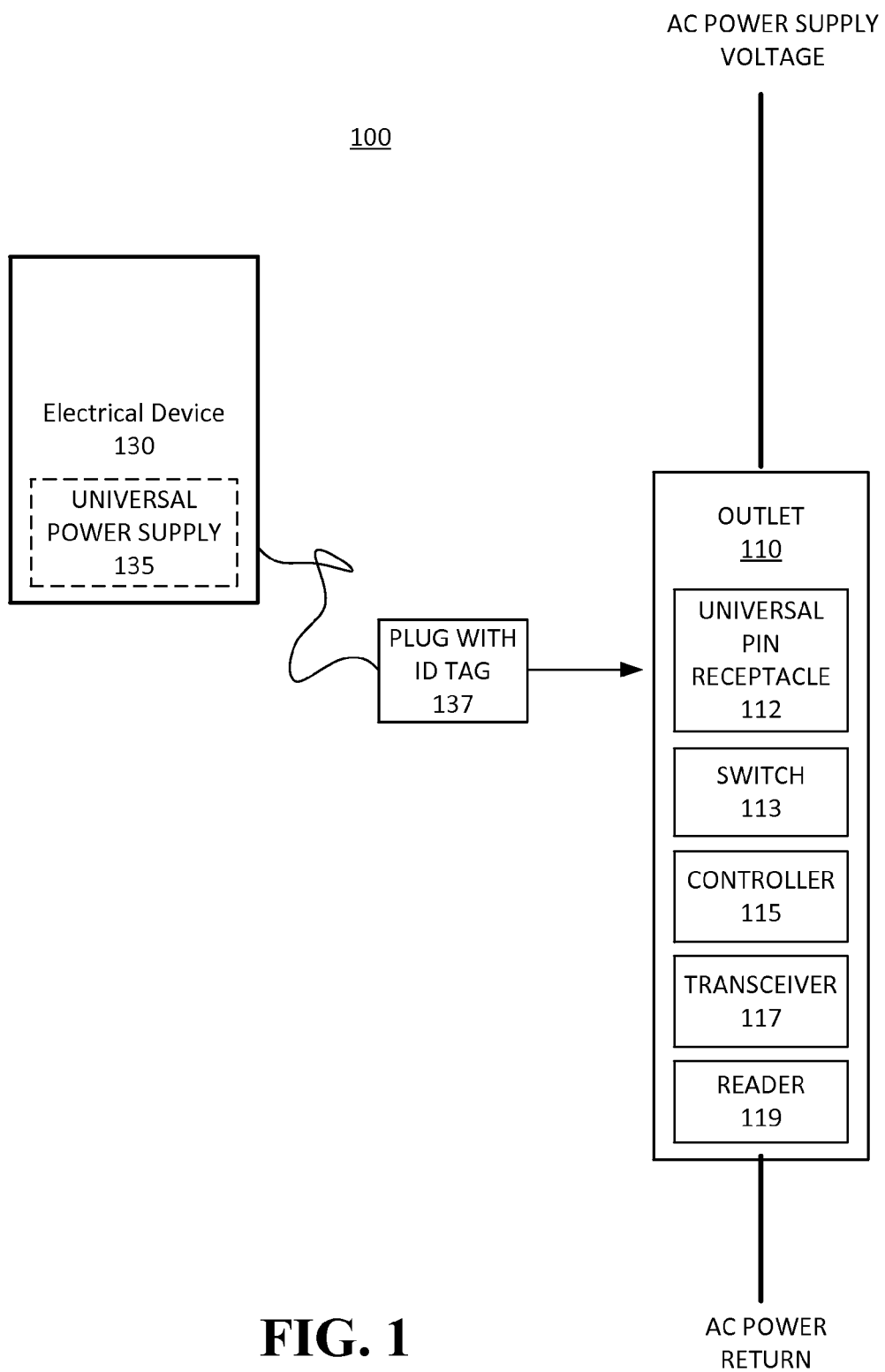
FIG. 1 shows an example system configuration according to an embodiment of the disclosed subject matter.

It would be advantageous for an outlet to be able to determine whether a device includes or is equipped with a universal power supply. This feature may allow the potentially hazardous situation described above to be avoided by providing a plug identification tag to indicate to the outlet that the device does not have a universal power supply, or supports only a limited voltage or frequency range. FIG. 1 illustrates an embodiment of a system 100 capable of determining whether a device has a universal power supply. An electrical device 130 may connect to a receptacle through a plug 137 that may have a communication tag. The plug 137 communication tag may store a variety of information related to the electrical device. For example, the communication tag may store data that identifies the device's model number, serial number, manufacturer, place of manufacture, date of manufacture, equipment installed on the device, such as a universal power supply 135, voltage capability (e.g., a minimum voltage, a maximum voltage, or a voltage range), voltage frequency capability (e.g., a minimum frequency, maximum frequency, or frequency range), and other information related to the electrical device. The universal power supply 135 may be optional equipment for the electrical device 130. For example, the power supply 135 may be sold or otherwise provided separately from the device 130, such as in an add-on or optional module that is combined with the device 130. The electrical device 130 may be a household appliance, such as a refrigerator, a television, a microwave, a lighting system, or an audio system, for example, or a personal appliance, such as a hairdryer, an electric razor, and the like.

The universal power supply 135 may be able to accept, for example, voltages in the range of approximately 90-260 volts AC that may have a frequency in the range of approximately 45-65 Hz. The universal power supply 135 may be able to convert or transform any commonly supplied voltages into a voltage acceptable for proper operation of the equipped device. A laptop, blu-ray player, electronic gaming system and the like may be equipped with a universal power supply as disclosed herein may be used in both the United States and Europe. For example, a laptop may have components that operate with a voltage of 110 volts and 60 Hz as is commonly provided in the United States, but a user may wish to use the laptop in Europe, where a common supply voltage is 240 volts and 50 Hz frequency. More generally, appliances as disclosed herein may be used in any location and/or with any voltage supply within a specified range, without requiring the appliance to be modified for use with a specific voltage.

The outlet 110 may receive AC electrical power from an AC electrical power source. The outlet 110 may include a universal pin configuration receptacle 112, a switch 113, controller 115, a transceiver 117 and a reader 119. The universal pin configuration receptacle 112 may accept several different types of commonly used plugs with different pins. For example, the plug may be a three pin configuration suitable for receiving 110 volts. Other plug configurations including two-pin, three-pin, four-pin or the like may be inserted into the universal pin configuration receptacle 112. The controller 115 may be a processor that executes program instructions to process data and provide control instructions to components. The reader 119 may read the plug identification tag to determine if the device has a universal power supply. The reader 119 may be capable of reading an RFID tag, near field communication (NFC) tag, or may be an optical barcode reader or an imaging device configured to obtain data from the plug communication tag.

The plug identification tag may be incorporated into a plug as an RFID label or tag, or a label incorporating a barcode, alphanumeric code or some other machine-readable code. For example, a near-field communication label or tag may be affixed to or embedded in a plug that may be read by the reader 119. Alternatively, the reader 119 on the outlet 110 may be an optical reader that reads a barcode or alphanumerical characters on the plug identification tag. A controller 115 within the outlet 110 may process the tag by performing, for example, optical character recognition (OCR) of the alphanumeric code read from the communication tag to obtain the identification information. Power for the controller 115 and other devices in the outlet 110 may be obtained from the AC power supply. Upon power loss, the switch 113 may default to a position that disconnects power from the device 130.

The controller 115 may have connections to the transceiver 117. The transceiver 117 may be responsive to control signals from the controller 115, and may connect with remote databases via Wi-Fi, the Internet, LAN, WAN or similar network. The controller 115 may retrieve data from the remote database related to the data read from the plug identification tag. The controller may process the data and output commands, for example, to the switch 113, based on the results of the processing. The outlet 110 may also include a memory (not shown) for storing data, such as a lookup table containing a listing of devices that may be plugged into the outlet. The list of devices may include devices that are expected to be plugged into the outlet 110. For example, if the outlet 110 is in a bathroom, then devices commonly used in a bathroom, such as hairdryers, razors, toothbrushes and the like will be included in the list of devices. The controller 115 may be programmed with location information to narrow the list of devices. The list of devices may be loaded into the outlet 110 memory at time of manufacture of the outlet or may be dynamically loaded when power is connected. The operation of the system 100 will be described in more detail with reference to FIG. 2.

FIG. 2 shows an example of a method for providing power to a device having a universal power supply according to an embodiment of the disclosed subject matter. The method 200 for providing electrical power to the universal power supply may begin by reading a device plug identification tag that is inserted in an outlet (step 210). The data read form the device plug identification tag may be processed by a controller. The electrical capability data of a device may be obtained by the controller, for example, by interpreting the NFC tag data, or performing optical character recognition of alphanumeric data, read from the device plug identification tag (step 220). The electrical capability data may indicate that the device contains a universal power supply, the device operating voltage and frequency, an operating voltage and frequency range, or combinations of each. Of course, other data may also be provided, such as a device model number and the like. The outlet may have an internal, non-volatile memory that stores a list of devices that have or are equipped with a universal power supply.

Alternatively, the outlet controller may access an external network and retrieve a list of devices that include a universal power supply. For example, the controller may send commands to a transceiver, which may access a communication network and connect to a remote data storage or server. A list of devices equipped with universal power supplies may be retrieved from the remote data storage or server, and may be provided to the controller.

At step 230, the controller may compare the obtained data with a list of devices equipped with universal power supplies that are compatible with supplied electric power. As a result of the comparison of the data read from the plug identification tag with the list of devices having universal power supplies, electrical power may be provided to the plugged-in device including the universal power supply (step 240). For example, if it is determined based on the comparison that the plugged-in device includes a universal power supply, the controller may output an indication, such as a control signal to the switch, that the device has a universal power supply. The control signal to the switch may cause contacts within the switch to close and provide electrical power to the plugged-in device.

In an embodiment, the outlet controller may access a website at a remote server to obtain an updated list of devices with universal power supplies. The outlet controller may also review the list of devices and make a separate determination of the presence of the universal power supply. The additional determination of the device having a universal power supply by the remote server provides confirmation to the outlet that the device includes a universal power supply. In the case of conflicting results, the outlet may not provide power to the plugged-in device.

In an embodiment, the outlet controller may deliver data identifying the plugged-in device to an external server, for example, and the external server may make the determination that the device includes a universal power supply. The outlet controller may receive the determination result from the external server. If the presence of a universal power supply determination is made by the remote server, the comparing step 230 may be eliminated. In which case, the controller may send an indication directly to the switch in response to the determination made by the remote server.

Figure 3:
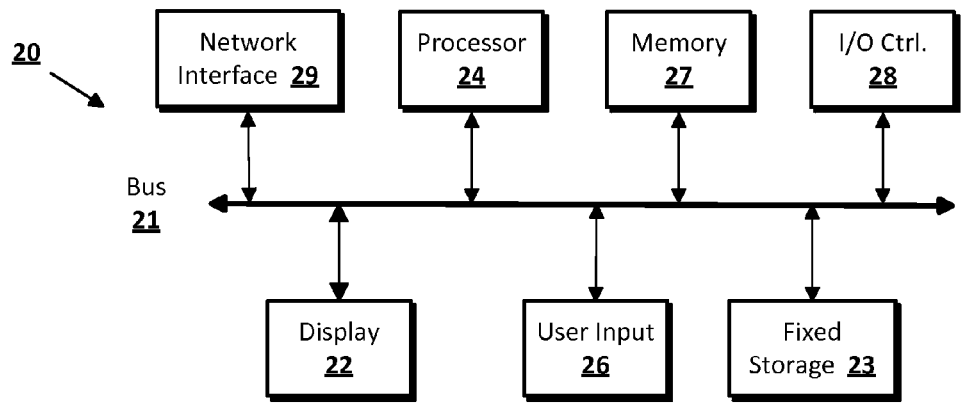
FIG. 3 shows a computer configuration according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20, which may act as an outlet controller, includes a bus 21 which interconnects major components of the computer 20, such as a central processor 24, a memory 27 (typically RAM, but which may also include ROM, flash RAM, or the like), an input/output controller 28, a user display 22, such as an indicator or small display, a user input interface 26, which may include one or more controllers and associated user input devices such as a button or switch, and the like, and may be closely coupled to the I/O controller 28, fixed storage 23, such as a hard drive, flash storage, Fibre Channel network, SAN device, SCSI device, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
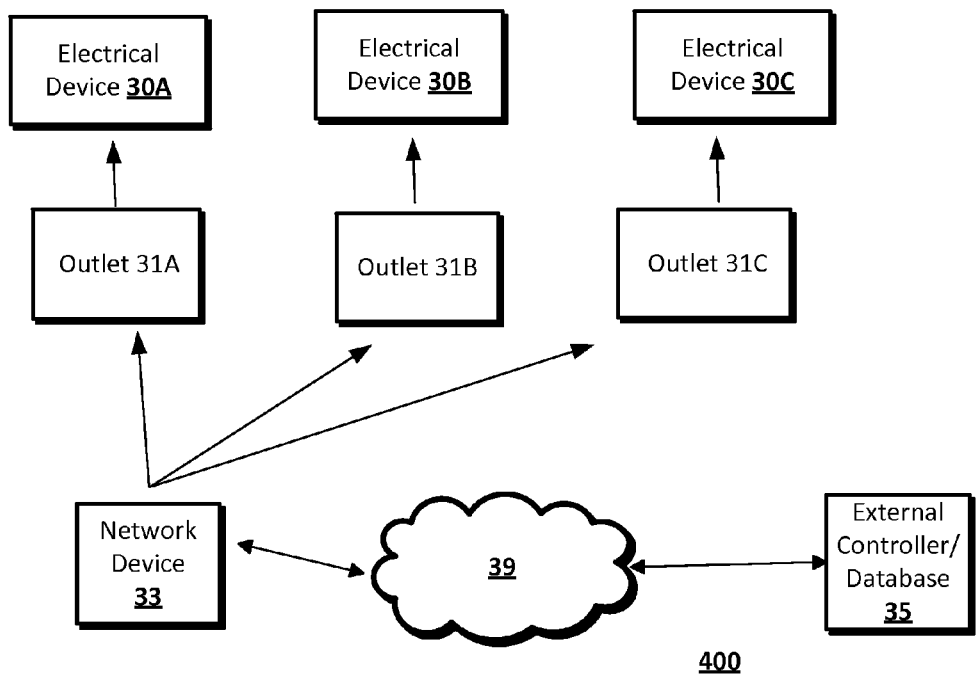
FIG. 4 shows a network configuration according to an embodiment of the disclosed subject matter.

FIG. 4 shows an example network arrangement 400 according to an embodiment of the disclosed subject matter. One or more electrical devices 30A-C, such as computers, light fixtures, razors, microwaves, and the like may connect to intelligent outlets 31A-C to receive electrical power. The outlets 31A-C may communicate with a network device 33. The network device 33 may include a processor that controls the operation of the outlets 31A-C. The network device 33 may communicate with the network 39, which may be a local network, wide-area network, the Internet, or any other suitable communication network or networks, and may be implemented on any suitable platform including wired and/or wireless networks. The outlets 31A-C may each communicate with one or more servers 35 and/or databases.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    reading a plug identification tag of an electrical device plug that is inserted in an outlet, the outlet configured to provide power at a single predefined specific voltage and frequency;
    obtaining a voltage and frequency compatibility of the electrical device based solely upon the read device plug identification tag,
    based upon the voltage and frequency compatibility, determining that the device contains a universal power supply; and responsive to determining that the device contains a universal power supply, providing electrical power to the electrical device at the single predefined specific voltage and frequency.

2. The method of claim 1, wherein the obtaining comprises:
sending commands to a transceiver, wherein the transceiver has access to a network;
retrieving a list of devices equipped with universal power supplies; and
providing the retrieved list of devices to the controller.

3. The method of claim 1, further comprising:
outputting an indication that the electrical capability data read from the plug is found on the list of devices.

4. The method of claim 1, further comprising:
in response to an outputted indication that the plugged-in electrical device has a universal power supply, operating a switching device to provide electrical power to the plugged-in electrical device.

5. The method of claim 1, further comprising:
accessing a website at a remote server to obtain an updated list of devices with universal power supplies; and
confirming, based on the updated list of devices, the presence of the universal power supply in the electrical device.

6. The method of claim 5, further comprising:
in response to a conflict between the list of devices obtained from a list of devices equipped with a universal power supply and the updated list of devices, the outlet does not provide electrical power to the electrical device.

7. A method comprising:
reading at an outlet a device plug identification tag connected to an electrical device, the outlet configured to provide electrical power at a single predefined specific voltage and frequency;
identifying an electrical capability of the electrical device from the read device plug identification tag, wherein the electrical capability of the electrical device indicates that the device includes a universal power supply;
obtaining a list of devices that have a universal power supply from an internal memory of the outlet;
confirming that the electrical capability data is included on the list of devices; and
based on the results of the confirmation, providing electrical power through the outlet to the device at the single predefined specific voltage and frequency.

8. The method of claim 7, wherein the obtaining comprises:
sending commands to a transceiver, wherein the transceiver has access to a network;
retrieving a list of devices equipped with universal power supplies; and
providing the retrieved list of devices to the controller.

9. The method of claim 7, further comprising:
outputting an indication that the data read from the plug is found on the list of devices.

10. The method of claim 7, wherein the providing power through the outlet to the device comprises:
in response to an outputted indication that the plugged-in electrical device has a universal power supply, operating a switching device to provide electrical power to the plugged-in electrical device.

11. A system comprising:
a power receptacle connected to a power supply and for supplying electrical power at a single predefined specific voltage and frequency to an electrical device, wherein the power receptacle is configured to receive a power supply plug of the electrical device;
a plug reader that reads a communication tag of an electrical device plug,
a power supply switch responsive to control signals;
a controller configured to:
receive read data from the plug reader;
in response to receiving data read from the communication tag, identify an electrical capability of the electrical device, wherein the electrical capability of the electrical device indicates that the device contains a universal power supply;
obtaining a list of devices that have a universal power supply from an internal memory;
confirming that the electrical capability data is included on the list of devices; and
based on the results of the confirmation, provide electrical power to the device at the single predefined specific voltage and frequency; and
a transceiver for sending and receiving signals.

12. The system of claim 11, wherein the controller is further configured to:
command the transceiver to retrieve a list of devices equipped with universal power supplies from a website at a remote server;
compare the data read from the plug with the list of devices equipped with universal power supplies; and
output an indication that the data read from the plug is found on the list of devices.

13. The system of claim 11, wherein the power supply switch is configured to:
in response to an outputted indication that the plugged-in electrical device has a universal power supply, provide electrical power to the plugged-in electrical device.

14. The system of claim 11, wherein the transceiver accesses a network to retrieve data from a data storage.

15. The system of claim 14, wherein the network is the Internet.

16. The system of claim 14, wherein the transceiver accesses the network via a wireless connection.

* * * * *